United States Patent
Młodawski et al.

(10) Patent No.: US 12,495,014 B2
(45) Date of Patent: Dec. 9, 2025

(54) SYSTEM AND METHOD FOR PEER TO PEER CHAT REVIEW

(71) Applicant: Livechat Software S.A., Wrocław (PL)

(72) Inventors: Mateusz Młodawski, Wrocław (PL); Paweł Szot, Sokołów Małopolski (PL)

(73) Assignee: Text Spolka Akcyjna, Wrocław (PL)

( * ) Notice: Subject to any disclaimer, the term of this patent is extended or adjusted under 35 U.S.C. 154(b) by 83 days.

(21) Appl. No.: 18/379,854

(22) Filed: Oct. 13, 2023

(65) Prior Publication Data
US 2024/0187365 A1   Jun. 6, 2024

Related U.S. Application Data

(60) Provisional application No. 63/429,609, filed on Dec. 2, 2022.

(51) Int. Cl.
| | | |
|---|---|---|
| G06F 15/16 | (2006.01) | |
| G06F 9/54 | (2006.01) | |
| G06F 21/10 | (2013.01) | |
| H04L 51/216 | (2022.01) | |

(52) U.S. Cl.
CPC ............ *H04L 51/216* (2022.05); *G06F 9/541* (2013.01); *G06F 21/107* (2023.08)

(58) Field of Classification Search
CPC ..... H04L 51/216; H04L 51/04; H04L 51/046; G06F 9/541; G06F 21/107
See application file for complete search history.

(56) References Cited

U.S. PATENT DOCUMENTS

| | | | | |
|---|---|---|---|---|
| 2010/0191799 | A1* | 7/2010 | Fiedorowicz | G06F 16/954 709/205 |
| 2016/0026962 | A1* | 1/2016 | Shankar | G06Q 10/06398 705/7.42 |
| 2018/0091654 | A1* | 3/2018 | Miller | H04M 3/42221 |

* cited by examiner

*Primary Examiner* — John B Walsh
(74) *Attorney, Agent, or Firm* — BelayIP

(57) ABSTRACT

The presented patent application outlines a system and method for peer-to-peer chat review. Operating via a mobile application, the system incorporates a data display to present chat threads, a rating module for user evaluations, and local and on-server databases for storage. Users can download threads on demand through an API unit. The architecture grants permissions to registered users, allowing access to specific chat thread sets. The method involves displaying and rating chat threads, storing them locally and on the server, and controlled thread downloads. This innovation offers a streamlined approach to assess and rate chat interactions, fostering efficient and structured peer-to-peer communication evaluations.

13 Claims, 8 Drawing Sheets

SYSTEM AND METHOD FOR PEER TO PEER CHAT REVIEW

CROSS REFERENCE TO RELATED APPLICATIONS

This application claims priority to US Provisional Patent Application filed Dec. 2, 2022 and assigned Application No. 63/429,609, the content of which is herein incorporated by reference.

BACKGROUND OF THE INVENTION

Instant communication channels are currently one of the most popular means of the exchange of information. Currently known solutions of instant communication employ an element usually referred to as chat widget. Use of chat widget is configured in the system settings to display the element on the webpage further viewed by the webpage visitor. Most examples of the use of instant communication channels are aimed at customer service and what is further implied such customer service may be a subject to further improvements thanks to chat reviews. Such reviews may originate from not only the supervisor but also from a chat person in the same place in the organization. Claimed system and method uses the idea of peer-to-peer review to assess chat quality.

Invention refers to a feedback system that enables viewing, rating and commenting of the chat threads of at least one user by other agents (also referred to as users) in the organized form. The invention discloses a system and method steps to organize and display chat threads with a possibility to define the scope of chat threads being displayed and organize it in a form that remains efficient for the user. It further enables the possibility of rating via mobile device that remains the most natural environment to preview communication threads.

BRIEF SUMMARY OF THE INVENTION

The disclosed invention enables the first user to rate the chat content of a plurality of other users, the other users potentially being at the same time chat agents. By chat agent, it is meant a person who operates the chat from the side of the business owner. The presently disclosed invention addresses certain technical problems including the facilitating of feedback flow in an environment of mass data processing. Instant communication channels implies the wide scope of data processing which brings with it the challenge of selective feedback delivery.

Embodiments of the proposed invention offer a versatile and seamless integration with various chat providers, providing a unified platform for enhancing chat communication. Through this novel system and method, chat content data is meticulously gathered, meticulously aggregated, and made accessible for viewing and rating by the initiating user. Crucially, this innovative approach empowers the user to conveniently access and evaluate chat conversations on their mobile device or computer without the necessity of a locally installed chat communication operator. This groundbreaking feature optimizes content storage, streamlines the rating process, and ensures efficient feedback loops, thereby elevating the overall quality of chat interactions and enabling agents to continually refine their performance for enhanced user satisfaction.

The instant system and method steps further optimize content displayed to the first user while originating from a plurality of chats by the facilitation of predefined conditions:
  Display for rating only messages that are not tagged/clustered with data of a defined feature, for example, marked as "spam" or "empty",
  Display for rating only messages that has at least one message from a real agent with the possibility to include/exclude chatbot scenarios;
  Display for rating only messages that has at least one message from the end-user; and
  Display for rating only messages that include certain content as for example "price", "discount", "refund" or any similar indication of such language based on Natural Language Processing.

BRIEF DESCRIPTION OF THE SEVERAL VIEWS OF THE DRAWINGS

Further advantages, features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, advantageous examples of the disclosure are set out with reference to the accompanying drawings, wherein.

DETAILED DESCRIPTION OF THE INVENTION

Figure 1:
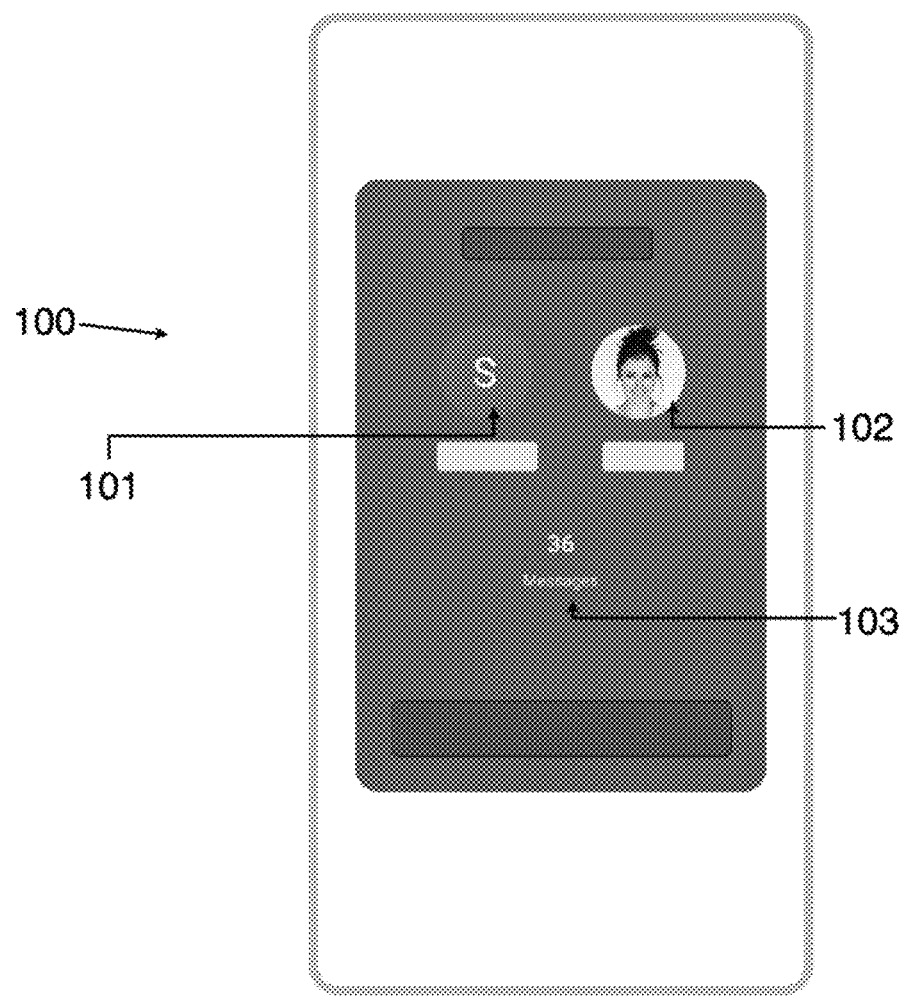
FIG. 1 depicts a view of the mobile application where the at least one user can assess chat thread.
Figure 2:
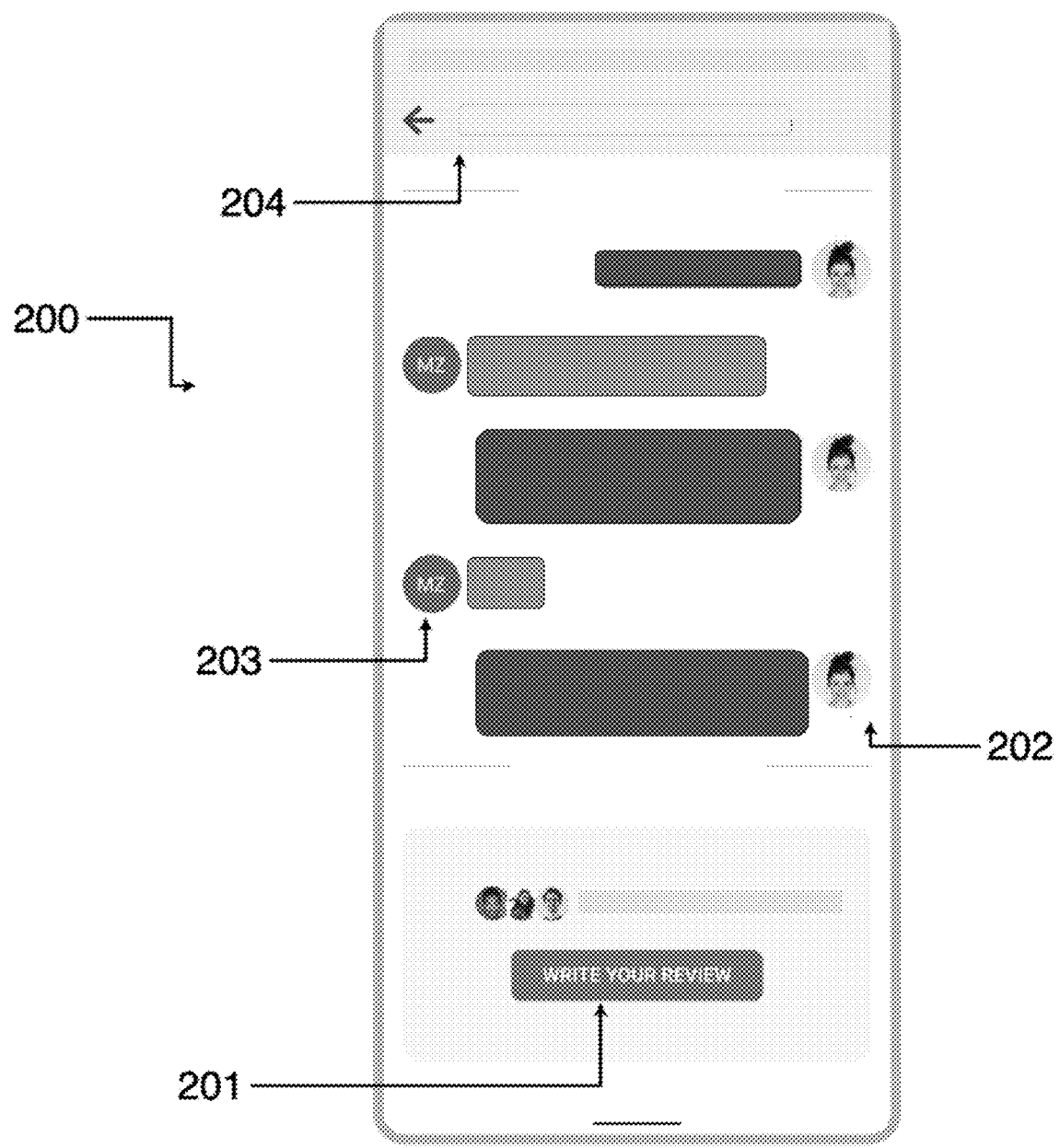
FIG. 2 depicts a view of the mobile application where the at least one user can assess chat thread with the "write your review" option being displayed.
Figure 3:
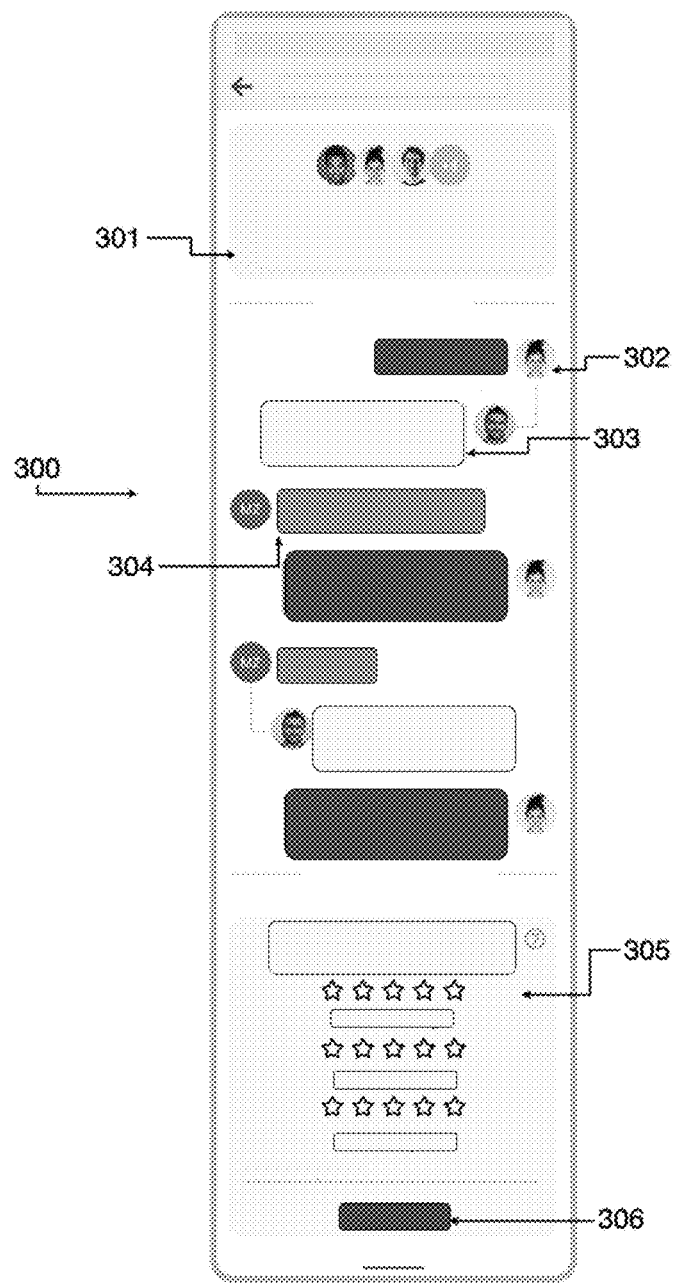
FIG. 3 depicts a view of the mobile application where the at least one user can assess a chat thread with the option of star assignment as the form of assessment.
Figure 4:
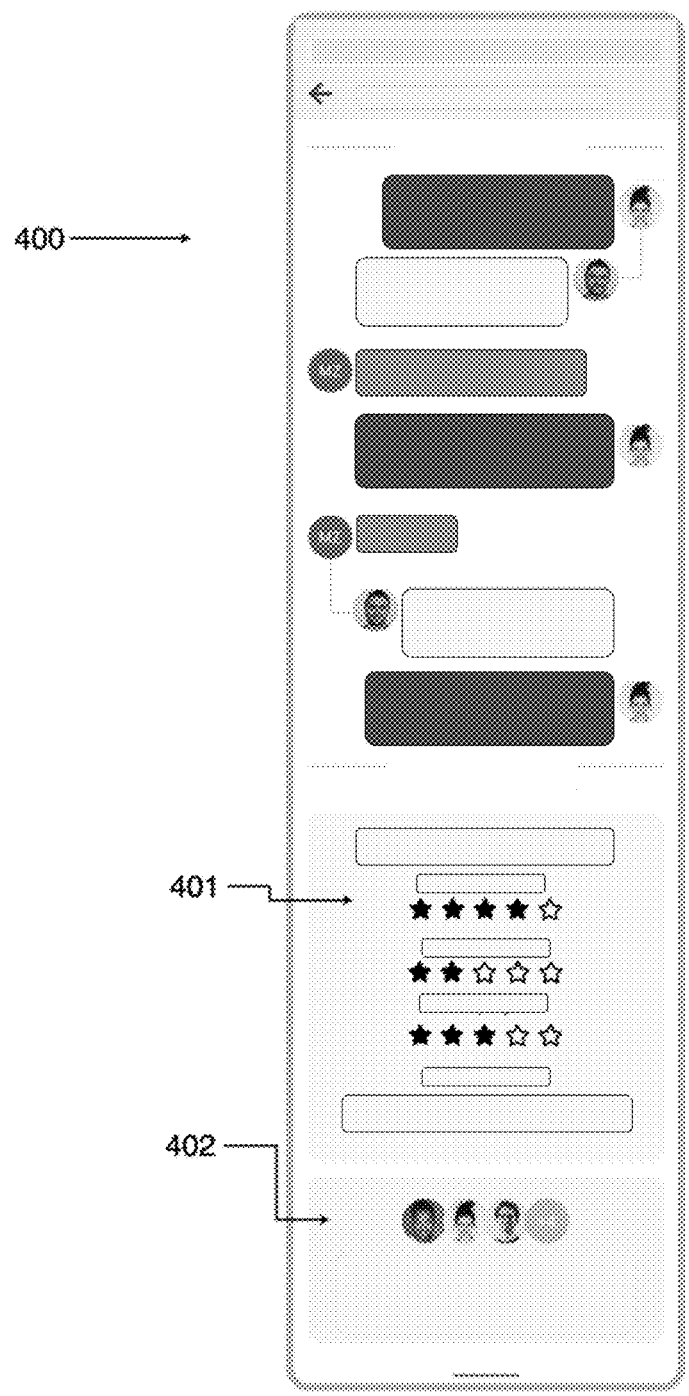
FIG. 4 depicts a view of the mobile application where the star assessment of the communication thread is being displayed.
Figure 5:
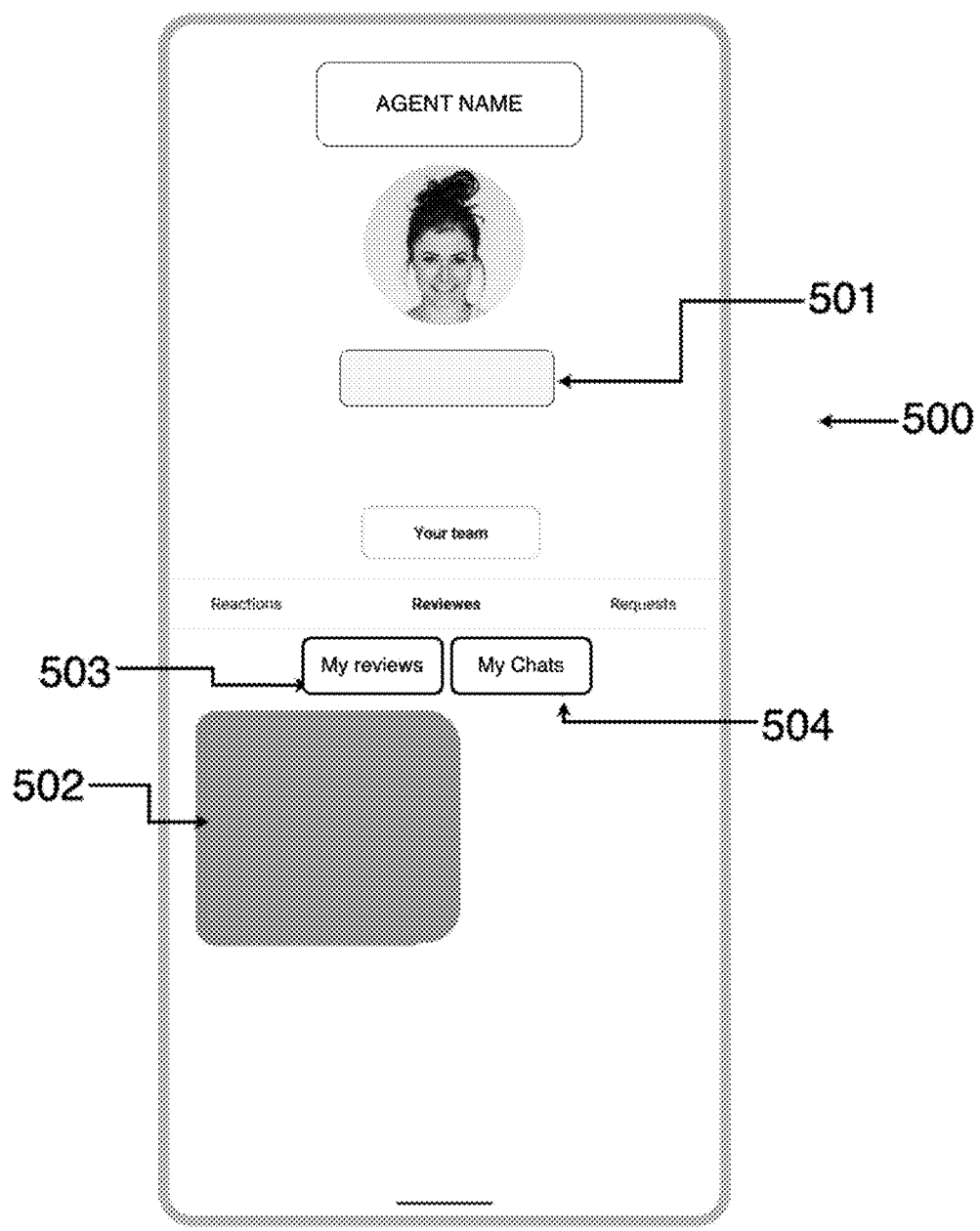
FIG. 5 depicts the preview of a review being assigned to the user with the option "my chats" enabled.
Figure 6:
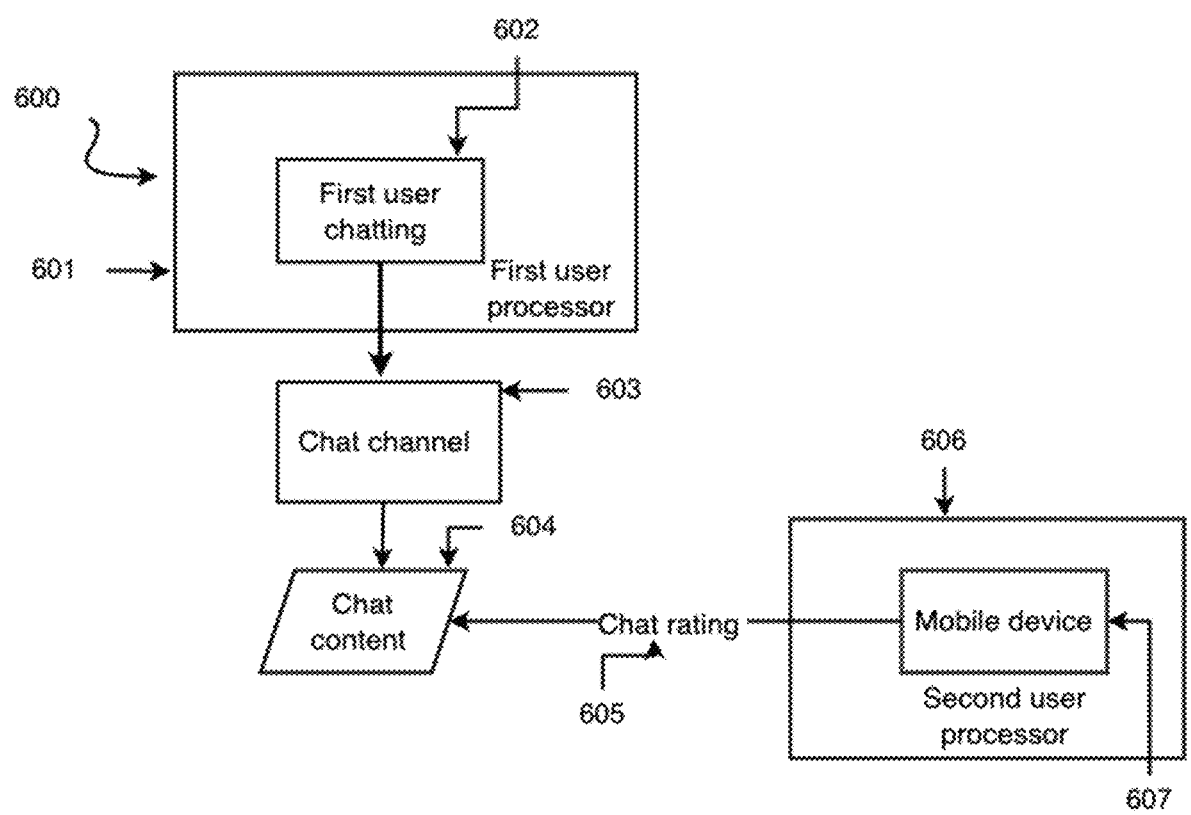
FIG. 6 depicts a simplified flow between the first and the second user wherein the second user uses the mobile device to assess chat threads.
Figure 7:
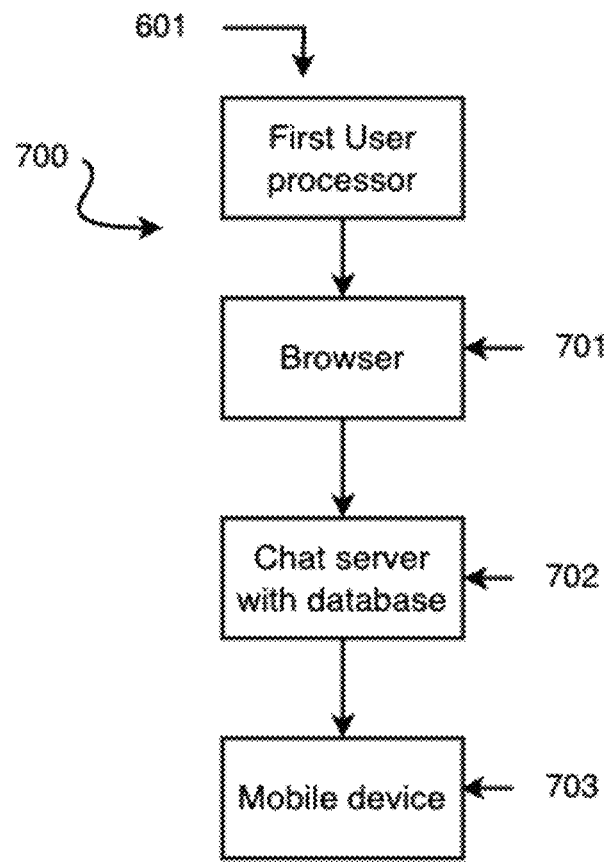
FIG. 7 depicts a simplified flow between elements of the system.
Figure 8:
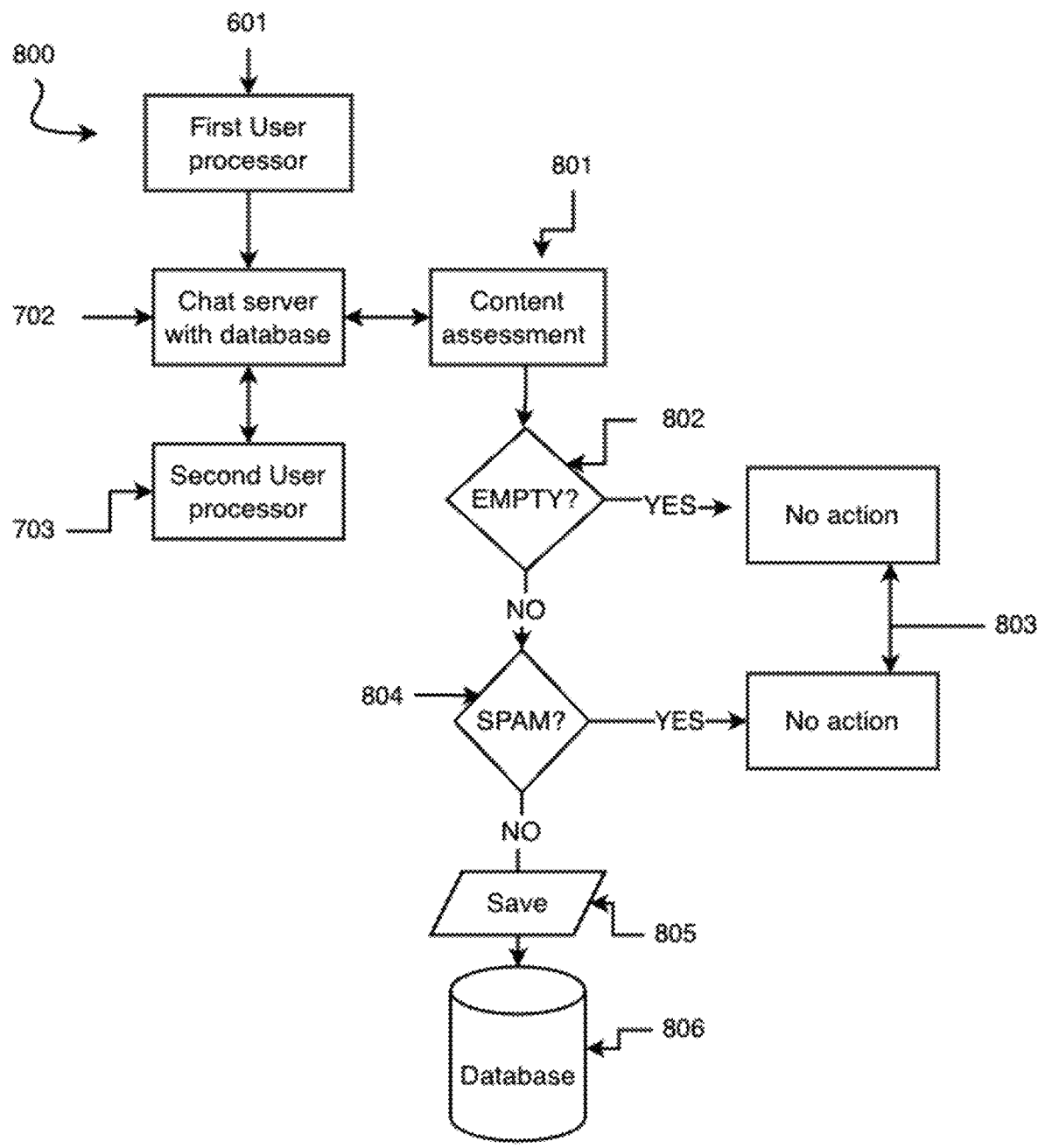
FIG. 8 a flow of elements to be checked before the chat thread is being displayed to the user for rating.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C"

should be understood as including not only one of A, only one of B, only one of C, or any combination of A, B, and C. In the figures, the same or functionally identical elements have been provided with the same reference signs.

The main embodiment of the invention enables the agent to collect the evaluation of chats performed between the agent (second user) and end user (first user of the invention) in an easy and accessible way. Precisely, the embodiment of the invention provides a system that operates on a mobile device that is integrated with the browser-operated chat system that enables preview and rating of chat communications of the agent among other agents with the access to the same account.

From the perspective of the elements included in the disclosed system, to facilitate operation the embodiment of the invention further discloses:

Mobile Application (607): A mobile application, which serves as the primary interface for the agent (second user) to interact with the chat system and is further arranged on the processor of the second user (606). The application should be compatible with various mobile platforms like iOS and Android.

Chat System Integration: The mobile application should be seamlessly integrated with the browser-operated chat system (603) used by the agent (602) and operating on the first user processor (601). This integration should allow real-time access to ongoing chat conversations between the agent and end users while it remains possible that the first user operates via browser (701) and the browser operates with the chat server with database (702) wherein the content is assessed with the use of mobile device of the second user (703).

User Authentication: To ensure security and privacy, a robust user authentication mechanism should be implemented. Agents need to log in securely to access their respective accounts and view their chat interactions.

Chat Content Collection: The system should be capable of collecting and storing chat content data (604), including messages exchanged between the agent and end users that are further collected for rating purposes (605). This data forms the basis for subsequent evaluation and rating based on the database infrastructure. Such database infrastructure shall enable the storage for the chat content and chat ratings wherein data source as well as the type of storage may be achieved with the use of different technologies and wherein the database storage include cloud storage.

Data Aggregation: The collected chat content data from various interactions needs to be aggregated and organized effectively for the evaluation process. It should allow the agent to have a clear overview of their past interactions and for the potential reference enable data storage including longer periods of time.

Preview and Rating Interface: The mobile application should provide an interface that allows the agent to preview their past chat conversations and rate them. The rating process could include various predefined criteria or custom rating options. Furthermore, preview shall be prepared to access and search as well as modify and update extensive data sets due to the possibility of plurality of chat conversations.

Multi-Agent Access: The system facilitates access for multiple agents who have the appropriate permissions to view and rate chat communications on the same account. This feature fosters peer-to-peer learning and feedback among agents.

Real-Time Updates: the embodiment of the invention is further capable of real-time updates, ensuring that agents can access the latest chat conversations and evaluate them promptly.

Offline Functionality: While online access is essential, the system further allows certain functionalities, such as accessing past chat records and ratings, in offline mode to ensure uninterrupted usage even in low or no network connectivity situations.

Data Privacy and Compliance: Compliance with data privacy regulations and protection of sensitive user information is crucial. The system further adheres to relevant laws and best practices to ensure the security and privacy of user data and enable the second user of the invention to erase the data of the chat communication or limit processing of personal data by hashing of particular elements of datasets structure upon individual need.

The presently disclosed invention includes the possibility of data display from the chat content filtered according to the predefined conditions. In such case, the user starts the process on the first user processor (601) via which the user engages into the communication with at least one other user 1. To facilitate data exchange including chat threads the application of the first user including the chat widget is arranged in communication with the server and database (702) and further collects the data sent via the processor of the second user (703) altogether exchanged by the chat widget.

It is possible to schedule a filter based on predefined conditions on the chat threads exchanged between users (801). In the case of such event, the filters shall provide the following assessment:

Display for rating only messages that are not tagged/clustered with data of a defined feature, for example, marked as "spam" (802) or "empty" (804);

If this condition is fulfilled in a negative manner (content is not qualified as a spam or is not empty) then the message is being saved (805) and as a consequence entry of this chat thread may be assessed as it is saved in the database (806);

If the condition is fulfilled in a positive manner (content is qualified as spam or is empty) then there is no action entitling saving such a chat thread;

Display for rating only messages that has at least one message from a real agent with the possibility to include/exclude chatbot scenarios;

Display for rating only messages that has at least one message from the end-user; and Display for rating only messages that include certain content as for example "price", "discount", "refund" or any similar indication of such language based on Natural Language Processing.

The system and method steps disclose an application for the first user of the present invention to set up an account to which all chat communication with this user will be assigned (102). Such profile of the user shall be further displayed to the plurality of other users (101) with the access to the chat conversations to rate the communication. The system enables the first user of the embodiment to rate the displayed content. An initial screen of the application also displays the amount of messages exchanged in the communication thread (103). The displayed content includes a view of an individual agent (202) with the summary of conversations and date. It further includes the communication thread with the responses of the end user (203) and the summary of individuals engaged in the conversation (204). The application indicates the possibility of conversation rating by the appropriate button (201).

The system and method disclosed in this patent application require a robust technical infrastructure to facilitate its main functionalities. At the core of this infrastructure are servers that host the application's backend. These servers act as the central point of communication and management for the system provided by the embodiment of the invention. This element of the infrastructure handles user account data, chat communication records, user profiles, and other relevant information. To interact with the servers and access the necessary data, APIs (Application Programming Interfaces) are employed. These APIs serve as the means of communication between the mobile application, the servers, and the databases.

Furthermore, the embodiment of the invention implies storing and managing various types of data. The system relies on databases to store user account information, chat communication data, and ratings provided by users. These databases are essential for efficient data retrieval, manipulation, and organization.

The user experience is pivotal in this embodiment of the invention. Thus, the system enables account management, displays user profiles, and showcases chat communication threads. The mobile application is the primary interface for users, allowing them to view their profiles and the conversations they have engaged in. The application draws information from the databases and presents it in a threaded format, making it easy for users to access their chat history and evaluate their interactions.

A main functionality of the embodiment of the invention is the ability for users to rate chat conversations. To make this possible, the application includes a user interface element, such as a rating button. When a user interacts with this button, the application captures the rating and communicates it back to the servers. The servers then update the database with the new rating, ensuring that it is associated with the appropriate conversation.

Real-time updates are crucial to keep users informed of new chat interactions, ratings, and other relevant information. For this purpose, the system implements server-side event handling, which communicates updates to the mobile application. The mobile application, in turn, updates its interface dynamically, allowing users to stay informed without manual refreshes.

Considering the sensitivity of chat communication, data security and privacy measures are paramount. The system implements robust security protocols and encryption mechanisms to safeguard user information and ensure secure interactions. Compliance with data privacy regulations is also upheld to maintain user trust and protect their privacy.

An individual conversation thread indicates an agent who is responsible for the chat communication (302) and space for a first user of the embodiment to write a comment to assess the chat (303), responses from the end user (304), as well as the list of chats of a particular user rated by others and the list of chats rated by the user. Lastly, the view discloses the information about the peer-to-peer reviewers who requested access to assess the conversation (301).

Furthermore, the comment may be assigned to the whole message or a piece of a message (particular word, a combination of words) to indicate precisely the commented element. The reviewers may get involved (402) in the assessment process based on factors such as:
 a. No prior assessments given to the communication thread or
 b. Certain prior feedback given by other reviewers.

Such prior feedback is summarized and displayed (401) for both the first user of the embodiment of the invention and other agents reviewing the communication thread. Furthermore, the user of the embodiment of the invention may sort or order offered chats in line with the individual preferences.

Each user (501) has his own list of chats (504) and the list further includes only chats that were viewed before. The first user is also able to see the list of reviews written by the first user (503) and up to date reviewed chats list (502). Furthermore, the user may view chats with specific reaction (tag) assigned by the user as "to discuss", "informative", "surprising".

As the first user of the embodiment performs a review of a chat or on the main screen dismisses a tab to the side (swipe left), such chat is removed from this list and not further displayed to the user. The chat is also, after a retention period, removed from the database of the embodiment to optimize the processing ability of the infrastructure. This list of chats synchronizes (backend infrastructure including database to mobile device or any other device that receives the data from the system). Such synchronization is performed in a real time manner. Each embodiment user license (account) is a separate "entity" in the embodiment database. When a user of a given license launches an app, the instant system and method steps perform following actions:
 if in the last 15 minutes another user on that license has not launched an application, then the download of chats from the chat provider API for that license;
 if the download starts, continue until one of the situations occurs:
  a. the download encounters a chat older than 30 days;
  b. the download encounters a chat that has already been downloaded before; and/or
  c. during this download, 100 or more chats have already been saved in the database.

All of the downloaded chats are analyzed by an algorithm—only the necessary information is saved in our database (e.g., chats that are tagged as "spam" are rejected, or those that do not have the statements of any agent [only bots]) chats, which are thus downloaded and saved on the backend for a given license, and further are shown in the application to users of that license.

Consequently, the presently described embodiment of the present invention aggregates the limited scope of data according to predefined conditions in the most optimal way for the aggregation and data clustering to ensure faster access to information and lower consumption of the processing power.

What is claimed is:

1. A system for peer to peer chat review comprising:
 a rating module configured to enable a rating of displayed chat threads created by at least one user;
 a local database arranged in a browser memory and configured to store most recent of the chat threads;
 a database and configured to store all chat threads and all ratings;
 an analyzing unit arranged on the server and configured to check the chat thread content;
 a download unit configured to download chat threads on demand of the at least one user;
 an API unit arranged on the server and configured to communicate with a chat communication channel to download the one of the chat thread; and
 wherein one of the chat threads is configured to include all messages exchanged via a chat widget between participants of the one of the chat threads, wherein the one of the chat threads is arranged to include a plurality of participants,
wherein the data display further comprises:
a chat thread display configured to display all messages exchanged in the one of the chat threads;
an assignment of information wherein the display includes a user assigned to the chat thread;
an end-user information display; and
a notes or comments display;
wherein the entity refers to any form of organization of the structures in the database arranged on the server; and
wherein the on-server database further comprises
license data configured to be a unique identifier of a registered account;
data of the one of the chat threads configured to be stored in connection with the unique identifier of the registered account;
rating data configured to be associated with the chat threads and including the rating by scale and textual content; and
wherein license data means information associated with the registered account including a number of users, chat threads associated with at least one of the users of this license;
wherein one account is configured to be connected to a plurality of mobile applications; and
wherein the chat threads are available to at least one user offline and online by download to a local device memory.

2. The system according to claim 1, wherein the rating module further comprises:
a rating scale configured to display a scale in a form of interface data inputs;
a comment input configured to accept textual content; and
wherein a list of users who request to rate a particular chat thread is composed of users registered to a license; and
wherein registration to a license means being present in the list of users stored in the on-server database.

3. The system according to claim 1, wherein the local database is arranged on the browser memory and configured to use local storage for data storage, including a license number, the latest of one of the chat threads, and user credentials.

4. The system according to claim 1, wherein the local database is configured to store a rating permission, wherein rating permission comprises an accepted request from at least one user.

5. A system according to claim 1, wherein the analyzing unit is further configured to:
check if there was at least one user that is not a chatbot communicating in the one of the chat threads;
check the content of the one of the chat threads and assess if the chat thread is spam.

6. The system according to claim 1, wherein the download unit is further configured to trigger one of the chat threads downloading via API and continuing the download until the download unit encounters at least one of the chat threads older than 30 days, the download unit encounters a chat threads that has already been downloaded before and/or 100 or more chat threads have already been saved in the on-server database during one session of the download unit.

7. The system according to claim 1, wherein the API unit is further configured to enable at least one of the chat threads to download and communication with the on-server database.

8. The system according to claim 2, wherein the list of users is further configured to include a permissions list of the users to access a set of one of the chat threads and configured to have a separate identification key in the on-server database based upon individual user assignments to the entity.

9. The system according to claim 2, wherein the rating module further comprises:
rating scale configured to display custom scale range based on predefined conditions; and
wherein the configuration of the custom scale range is defined per license; and
wherein the on-server database is configured to store a plurality of custom scale ranges.

10. The system according to claim 2, wherein the rating module is further configured to enable predefined conditions to exclude the one of the chat threads from the chat thread display when the chat thread includes defined words.

11. A method for peer-to-peer chat review, the method comprising the steps of:
displaying data on mobile devices configured to display one of the chat threads to at least one user;
enabling rating module on the one of the chat threads on a mobile device;
storing most recent chat threads in a local database arranged in the browser memory;
storing all chat threads and all ratings in an on-server database;
downloading chat threads on demand of the at least one user;
downloading all the one of the chat threads available to the at least one user;
displaying the one of the chat threads at a time to at least one user;
displaying a next chat thread to the at least one user after a swipe right performed on the mobile device; and
enabling the at least one user to rate one of the chat threads;
integrating an API chat communication channel with a mobile application to download at least one of the chat threads;
wherein data display configured to operate on mobile devices operates in a form of mobile application;
wherein at least one of the chat threads is configured to include a plurality of participants; and
wherein a rating includes a displaying scale comprising interface data inputs and a textual comments section.

12. The method according to claim 11, further comprising the steps of:
downloading the one of the chat threads from the chat provider via API; and
if the download starts, continuing until one of the situations occurs:
the download encounters at least one of the chat threads older than 30 days;
the download encounters at least one of the chat threads that has already been downloaded before;
100 or more chat threads have already been saved in the on-server database during one session of the download unit; and
wherein downloading at least one of the chat threads from the chat provider via API is divided per license; and
wherein downloading at least one of the chat threads from the chat provider in a last predefined time unit at least one another user on that license has not launched an application.

13. The method according to claim 11, further comprising the steps of:

checking if there was at least one user that is not a chatbot communicating in the one of the chat threads;
checking the content of the chat thread and assessing if the one of the chat threads is spam;
excluding from a display one of the chat threads where at least one user is a chatbot;
excluding from a display one of the chat threads where spam content is detected;
excluding from a display one of the chat threads where a predefined word that is configured by the at least one user is detected; and
display for rating only messages that have at least one message from an end-user.

\* \* \* \* \*